(12) United States Patent
Ferrara et al.

(10) Patent No.: US 8,327,457 B1
(45) Date of Patent: Dec. 4, 2012

(54) MANAGING ASSET ACCESS

(75) Inventors: Rachael L. Ferrara, Lee's Summit, MO (US); Paul L. Gustafson, Sugar Hill, GA (US); Christina L. McCormick, Olathe, KS (US); Star Moran, College Park, GA (US)

(73) Assignee: Sprint Communications Company L.P., Overland Park, KS (US)

( * ) Notice: Subject to any disclaimer, the term of this patent is extended or adjusted under 35 U.S.C. 154(b) by 907 days.

(21) Appl. No.: 12/262,969

(22) Filed: Oct. 31, 2008

(51) Int. Cl.
G06F 7/04 (2006.01)
G06F 17/30 (2006.01)
H04N 7/16 (2006.01)

(52) U.S. Cl. ............... 726/27; 726/26; 726/2; 399/366; 455/26.1; 700/225; 700/226; 700/227; 705/18; 705/57; 705/58

(58) Field of Classification Search ............... 726/27
See application file for complete search history.

(56) References Cited

U.S. PATENT DOCUMENTS

| 7,774,827 B2 * | 8/2010 | Kinser et al. ............... 726/3 |
| 2006/0101019 A1 * | 5/2006 | Nelson et al. ............... 707/9 |
| 2011/0099558 A1 * | 4/2011 | Patrick et al. ............... 719/315 |

* cited by examiner

Primary Examiner — James A Reagan

(57) ABSTRACT

A system is provided for managing asset access. The system includes a processor, a user manager interface, an asset manager interface, and an access tool. The access tool, when executed by the processor, compiles a user list of user access to restricted assets, provides the user list to the user manager interface, and receives a modified user list of user access to the restricted assets from the user manager interface. The access tool also compiles an asset list of user access to the restricted assets, provides the asset list to the asset manager interface, and receives a modified asset list of user access to the restricted assets from the asset manager interface. Additionally, the access tool modifies the user access to at least one of the restricted assets based on at least one of the modified user list and the modified asset list.

20 Claims, 5 Drawing Sheets

| User 202 | Asset 204 | Role 206 | Access 208 | Status 210 | Manager 212 | Time 214 | Received 216 |
|---|---|---|---|---|---|---|---|
| Pat | Database | Security Table | Read Only | | Chris | 7-21-08 10:21 | 7-17-08 |
| Bob | Identity Management | O.S. Security | Insert Update Delete | | Chris | 7-21-08 10:21 | 7-17-08 |
| Vicky | Finance | User Maintenance | Not Available | | Chris | 7-21-08 10:21 | 7-17-08 |
| Vicky | Network Analysis | Administrator | Not Available | | Chris | 7-21-08 10:21 | 7-17-08 |
| Pat | Database | Login Access | Update Access | | Chris | 7-21-08 10:21 | 7-17-08 |
| Pat | Database | Security Table | Update Access | | Chris | 7-21-08 10:21 | 7-17-08 |
| Pat | Accounts Receivable | Login Access | Not Available | | Chris | 7-21-08 10:21 | 7-17-08 |
| Tom | Identity Management | Profile Manager | Insert Update Delete | Approved | Chris | 7-21-08 10:21 | 7-17-08 |
| Bob | Identity Management | WebAdministrator | Insert Update Delete | Approved | Chris | 7-21-08 10:21 | 7-17-08 |
| Tom | Identity Management | Sales Dealer | Insert Update Delete | Modified | Chris | 7-21-08 10:21 | 7-17-08 |
| Tom | Identity Management | Vendor Manager | Insert Update Delete | Approved | Chris | 7-21-08 10:21 | 7-17-08 |
| Tom | Identity Management | Sales Executive | Insert Update Delete | Added | Chris | 7-21-08 10:21 | 7-17-08 |
| Tom | Identity Management | Vendor Manager | Insert Update Delete | Removed | Chris | 7-21-08 10:21 | 7-17-08 |
| Tom | Active Directory | ProvisioningTeam | Not Available | Approved | Chris | 7-21-08 10:21 | 7-17-08 |
| Vicky | Human Capital | User Maintenance | Not Available | Approved | Chris | 7-21-08 10:21 | 7-17-08 |
| Tom | Human Resources | Real Estate | Not Available | Approved | Chris | 7-21-08 10:21 | 7-17-08 |
| Bob | Operating System | UserSynchronization | Not Available | Approved | Chris | 7-21-08 10:21 | 7-17-08 |
| Tom | Identity Management | WebAdministrator | Insert Update Delete | Approved | Chris | 7-21-08 10:21 | 7-17-08 |
| John | Identity Management | Vendor Manager | Not Available | Terminated | Chris | 7-21-08 10:21 | 7-17-08 |
| Mike | Identity Management | Vendor Manager | Not Available | Not Mine | Chris | 7-21-08 10:21 | 7-17-08 |

Fig. 2

| User 302 | Asset 304 | Role 306 | Access 308 | Status 310 | Manager 312 | Time 314 | Received 316 |
|---|---|---|---|---|---|---|---|
| Bob | Identity Management | O.S. Security | Insert Update Delete | Approved | Jean | 8-04-08 11:21 | 7-31-08 |
| Tom | Identity Management | Profile Manager | Insert Update Delete | Approved | Jean | 8-04-08 11:21 | 7-31-08 |
| Bob | Identity Management | WebAdministrator | Insert Update Delete | Approved | Jean | 8-04-08 11:21 | 7-31-08 |
| Tom | Identity Management | Sales Dealer | Insert Update Delete | Modified | Jean | 8-04-08 11:21 | 7-31-08 |
| Tom | Identity Management | Vendor Manager | Insert Update Delete | Approved | Jean | 8-04-08 11:21 | 7-31-08 |
| Tom | Identity Management | Sales Executive | Insert Update Delete | Added | Jean | 8-04-08 11:21 | 7-31-08 |
| Tom | Identity Management | Vendor Manager | Insert Update Delete | Removed | Jean | 8-04-08 11:21 | 7-31-08 |
| Tom | Identity Management | WebAdministrator | Insert Update Delete | Approved | Jean | 8-04-08 11:21 | 7-31-08 |
| John | Identity Management | Vendor Manager | Not Available | Terminated | Jean | 8-04-08 11:21 | 7-31-08 |
| Mike | Identity Management | Vendor Manager | Not Available | Not Mine | Jean | 8-04-08 11:21 | 7-31-08 |
| Rachael | Identity Management | O.S. Security | Not Available | Approved | Jean | 8-04-08 11:21 | 7-31-08 |
| Paul | Identity Management | Profile Manager | Insert Update Delete | Approved | Jean | 8-04-08 11:21 | 7-31-08 |
| Chris | Identity Management | WebAdministrator | Not Available | Added | Jean | 8-04-08 11:21 | 7-31-08 |
| Star | Identity Management | Sales Dealer | Not Available | Removed | Jean | 8-04-08 11:21 | 7-31-08 |

MANAGING ASSET ACCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprises use access control systems to grant data users the capability to access assets, which may be software, hardware, firmware, or combinations thereof. Access to assets includes the ability to create files, read files in specific directories or in certain systems, the ability to read and write the files, and the ability to create, read, write, and delete the files. Role-based access control systems grant access to assets based on assigned user roles. For example, a manager of many employees uses a role-based access control system to assign one user role (e.g., billing user) out of many user roles to one of their employees or users. The assigned user role enables the employee to access a specific asset to modify a variety of billing records. By assigning one of many roles to the employee/user, the manager does not have to evaluate individual access to each of numerous billing records in the associated asset when granting access to each employee. However, existing role-based systems may allow a manager to assign any user role to the manager's employees. For example, a billing manager can assign a billing user role to an employee to access a sales department asset even though the sales manager who supervises the sales department asset does not want the employee to be able to access the sales department asset to modify billing records.

In contrast to role-based access control systems, discretionary access control systems enable a manager who has exclusive responsibility for an asset to be the only manager who can grant users access to that asset. For example, a billing website manager may be the only manager that can grant access to the billing website to any user. However, discretionary access control systems still present certain problems. For example, the discretionary access control system enables the billing website manager to grant access to the billing website to a user who works in a sales department even though the sales manager who supervises the user does not want the user to be able to access the billing website. The above-described access control systems may not satisfy the needs of an organization that needs to enforce responsibility for ensuring that security procedures are followed or to enable auditors to verify that security procedures are followed.

SUMMARY

In some embodiments a system is provided for managing asset access. The system includes a processor, a user manager interface, an asset manager interface, and an access tool. The access tool, when executed by the processor, compiles a user list of user access to restricted assets, provides the user list to the user manager interface, and receives a modified user list of user access to the restricted assets from the user manager interface. The access tool also compiles an asset list of user access to the restricted assets, provides the asset list to the asset manager interface, and receives a modified asset list of user access to the restricted assets from the asset manager interface. Additionally, the access tool modifies the user access to at least one of the restricted assets based on at least one of the modified user list and the modified asset list.

In some embodiments, a computer implemented method is provided for managing asset access. A user list of user access to restricted assets is compiled. The user list is provided to a user manager interface. A modified user list of user access to the restricted assets is received from the user manager interface. An asset list of user access to the restricted assets is compiled. The asset list is provided to an asset manager interface. A modified asset list of user access to the restricted assets is received from the asset manager interface. The user access to at least one of the restricted assets is modified based on at least one of the modified user list and the modified asset list.

In some embodiments, a method is provided for managing asset access. Role conflict data is received via an asset manager interface, wherein the role conflict data defines conflicting asset access roles for any user. A user list of user access to restricted assets is compiled. The user list is provided to a user manager interface. A modified user list of user access to the restricted assets is received from the user manager interface. The modified user list is amended based on the role conflict information. An asset list of user access to the restricted assets is compiled. The asset list is provided to an asset manager interface. A modified asset list of user access to the restricted assets is received from the asset manager interface. The user access to at least one of the restricted assets is modified based on at least one of the amended modified user list and the modified asset list.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 shows a frame of a user list for managing asset access according to some embodiments of the present disclosure.

FIG. 3 shows a frame of an asset list for managing asset access according to some embodiments of the present disclosure.

DETAILED DESCRIPTION

Figure 1:
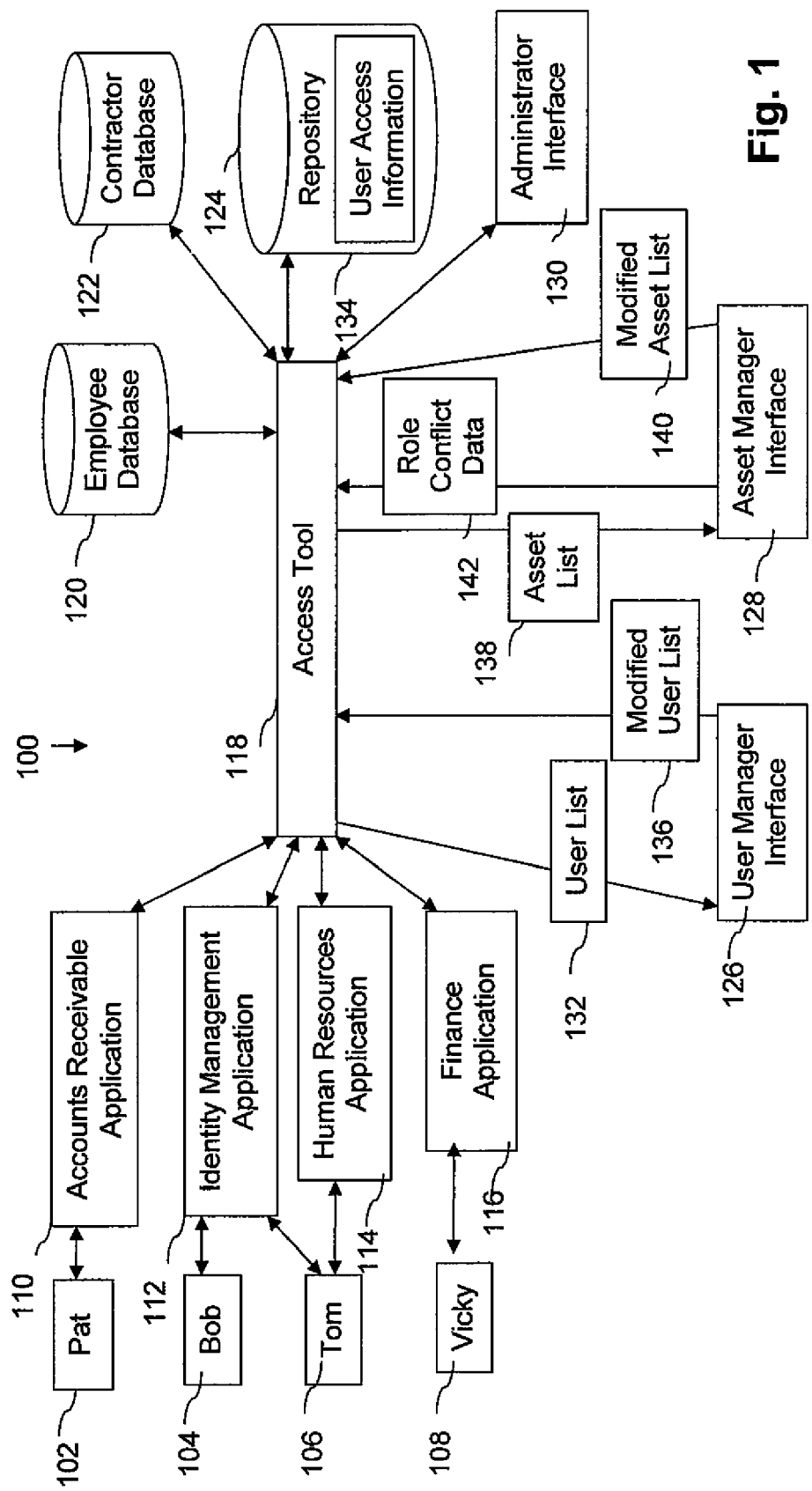
FIG. 1 shows a system for managing asset access according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

An access control system may send a separate asset access e-mail to a manager for each asset that the manager's staff may access. If the manager's staff of employees and contractors may access 45 assets, the manager may receive 45 different asset access e-mails, such that the manager may not respond to one of the e-mails believing the e-mail to be about a similarly named asset for which the manager has already responded. When the manager responds to each e-mail individually, the manager may evaluate an employee's access to an asset based on the manager's erroneous recollection of the employee's access to other assets.

In some embodiments an access tool manages asset access. The access tool compiles a user list and provides the user list to a user manager interface. The user list provides a user manager with a comprehensive view of each of the manager's users and each asset that these users may access. This comprehensive view enables the user manager to evaluate which users need access to which assets within the context of each asset the users may access. The user manager modifies the user list to indicate which assets may be accessed by which users, and sends the modified user list from the user manager interface to the access tool. The access tool compiles an asset list and provides the asset list to an asset manager interface. The asset list provides an asset manager with a comprehensive view of each of the asset manager's assets and which users may access these assets. This comprehensive view enables the asset manager to evaluate which users need access to which assets within the context of all the users that may access the asset manager's assets. The asset list may reflect the modifications made by the user manager in the modified user list, enabling the asset manager to review asset access recommendations made by each user's manager. The asset manager modifies the asset list to indicate which assets may be accessed by which users, and sends the modified asset list from the asset manager interface to the access tool. The access tool modifies the user access to at least some of the restricted assets based on the modified user list and/or the modified asset list, taking into account recommendations made by the user manager and approvals of the recommendations made by the asset manager. Alternatively, the access tool may provide the asset list to the asset manager interface, receive asset access recommendations in a modified asset list from the asset manager, and then provide the user list to the user manager interface, where the user list reflects the modifications made by the asset manager in the modified asset list. Auditors may use the access tool to search for data in the various lists to verify that appropriate users have appropriate access to restricted assets. If the asset manager has identified some user roles that conflict with other user roles, the access tool can compare all recommendations and approvals to insure that no user is assigned roles that conflict. For example, assigning the conflicting roles of supply chain management and accounts payable to the same user may create a fraud risk by enabling the user to both establish payment accounts for vendors and to issue payments to the same vendors.

Turning now to FIG. 1, a block diagram of an illustrative system 100 for managing asset access is depicted. The system 100 includes users 102-108 that have access to restricted assets 110-116, such as Pat 102, Bob 104, Tom 106 and Vicky 108 that have access to an accounts receivable application 110, an identity management application 112, a human resources application 114, and a finance application 116.

The system also includes an access tool 118, an employee database 120, a contractor database 122, a repository 124, a user manager interface 126, an asset manager interface 128, and an administrator interface 130. Although FIG. 1 depicts one of each of the interfaces 126-130, the system 100 may include any number of each of the interfaces 126-130. The access tool 118 may communicate with the restricted assets 110-116, the employee database 120, the contractor database 122, the repository 124, the user manager interface 126, the asset manager interface 128, and the administrator interface 130.

The access tool 118 may communicate with the employee database 120 and the contractor database 122 to compile a list of all the users 102-108 that have access to the restricted assets 110-116 and a list that identifies a manager for each of the users 102-108. The access tool 118 communicates with the restricted assets 110-116 to determine which of the users 102-108 have access to which of the restricted assets 110-116. For example, Pat 102 has access to the accounts receivable application 110, Bob 104 has access to the identity management application 112, Tom 106 has access to the identity management application 112 and the human resources application 114, and Vicky 108 has access to the finance application 116.

The access tool 118 collects the list of all the users 102-108 and the determination of which of the users 102-108 have access to which of the restricted assets 110-116 to create a user list 132 of user access to the restricted assets 110-116. The access tool 118 stores the user list 132 as user access information 134 in the repository 124. The access tool 118 uses the list that identifies a manager for each of the users 102-108 to identify each manager that will be provided with their own user list 132 that lists only the users supervised by the manager by validating the manager's login identifier stored for each manager. The access tool 118 provides each of the different user lists 132 to the appropriate user manager interface 126 so that a user manager may review access to the restricted assets 110-116 by each of the users 102-108 supervised by the user manager. The user manager creates a modified user list 136 by modifying the user list 132 to indicate which of the restricted assets 110-116 may be accessed by which of the users 102-108. The access tool 118 receives the modified user list 136 from the user manager interface 126, and may store the modified user list 136, the time the modified user list 136 was received, and the identity of the user manager who modified the modified user list 136 as part of the user access information 134. Although FIG. 1 depicts one of each of the lists 132 and 136-140, the system 100 may include any number of each of the lists 132 and 136-140.

The access tool 118 also compiles an asset list 138 of user access to the restricted assets 110-116, and may store the asset list 138 as part of the user access information 134. The asset list 138 may be based on the modified user list 136. For example, if the modified user list 136 includes a recommendation to remove a user's access to one of the restricted assets 110-116, the asset list 138 includes the recommendation. The access tool 118 provides the asset list 138 to the asset manager interface 128 so that an asset manager may review access by each of the users 102-108 to the restricted assets 110-116 that are supervised by the asset manager. The asset manager creates a modified asset list 140 by modifying the asset list 138 to indicate which of the users 102-108 may access the restricted assets 110-116 supervised by the asset manager. The access tool 118 receives the modified asset list 140 from the asset manager interface 128, and may store the modified asset list 140, the time the modified asset list 140 was received, and the identity of the asset manager who modified the modified asset list 140 as part of the user access information 134. The access tool 118 may send a revised user list 132 that is based on the modified asset list 140 to the user manager interface 126 to enable the user manager to review modifications made in the modified asset list 140. If the user manager approves of the modifications made in the modified asset list 140, the access tool 118 may indicate that this portion of the asset access process is completed for the current quarter. However, if the user manager makes revisions to the revised user list 132 that is based on the modified asset list 140, the access tool 118 may send a revised asset list 138 based on the revisions to the revised user list 132 to the asset manager interface 128, and continue the iterative asset access process until the user manager and the asset manager stop making revisions.

The asset manager may also create and send role conflict data 142 from the asset manager interface 128 to the access tool 118. The role conflict data 142 may be formatted in a spreadsheet matrix, and define conflicting access asset roles for any of the users 102-108. For example, assigning a supply chain management user role for the finance application 116 and an accounts payable user role for the finance application 116 to the same user may create a fraud risk by enabling the user to both establish payment accounts for vendors and to issue payments to the same vendors. Therefore, the asset manager for the finance application 116 uses the asset manager interface 128 to submit the role conflict data 142 that defines the supply chain management and accounts payable roles as conflicting roles. In another example, assigning a proposal generator role for the finance application 116 and proposal approval user role for the finance application 116 to the same user may create a fraud risk by enabling the user to both generate proposals and to approve the same proposals. In yet another example, assigning an accountant user role for the human resources application 114 and an accountant supervisor user role for the human resources application 114 to the same user may create a fraud risk by enabling the user to submit a performance review or a pay raise for themselves. Additionally, administrators and/or auditors may use the administrator interface 130 to submit the role conflict data 142.

The access tool 118 may amend the modified user list 136 based on the role conflict data 142. For example, if a user manager submitted a modified user list 136 that included a recommendation to assign the supply chain management and accounts payable roles to the same user, the access tool 118 may delete one of these conflicting user role assignments. Alternatively, the access tool 118 may highlight one of these conflicting user role assignments in the asset list 138 sent to the asset manager interface 128. The asset manager viewing the asset list 138 via the asset manager interface 128 may decide which of the conflicting user roles to cancel for the assigned user, or to permit the conflicting roles for the assigned user. The access tool 118 may also send a notice to the administrator interface 130 that identifies the conflicting roles for the assigned user that were permitted by the asset manager. Additionally, the access tool 118 may compile the user list 132 based on the role conflict data 142, such that one of the conflicting roles that is already assigned to a user is flagged to be deleted from the user list 132 that is sent to the user manager interface 126. Alternatively, the conflicting roles that are already assigned to a user are highlighted in the user list 132 that is sent to the user manager interface 126. The administrator interface 130 may permit conflicting asset access roles assigned to a user in response to an appeal from a user manager who believes that an asset manager incorrectly identified some user roles assigned by the user manager as conflicting or that such conflict is necessary in order to fulfill that user's job responsibilities.

A user of the system 100 may submit a search of the user access information 134 based on the user list 132, the modified user list 136, the asset list 138, the modified asset list 140, the identity of a user manager, the identity of an asset manager, the confirmation of modifications, the identity of a user, any of the restricted assets 110-116, or any combinations thereof. In response to the submitted search, the interface that submitted the search displays the corresponding user access information 134.

The access tool 118 may track and display instances when a user manager is overruled by an asset manager, when access is removed and then added for the same user, and when access for a terminated user is removed by the access tool 118 instead of by the user manager interface 126. For example, the user access information 134 specifies that user access recommendations from a user manager have been overruled 20 times in the last quarter by various asset managers, and that the 20 overruled recommendations make up 10% of all the user manager's recommendations. The frequency of overruled recommendations may indicate the degree to which the user manager understands the asset manager's guidelines for assigning access. An administrator may use such user access information 134 to train the user manager to better understand the asset manager's guidelines for assigning access. In another example, the user access information 134 identifies 5 times that a user manager removed access and added the same access for the same users during the most recent quarter, which may indicate a level of indecision. An administrator may use such user access information 134 to train the user manager to make more stable access decisions. In yet another example, the user access information 134 specifies that the access tool 118 removed user access for 10 terminated users under the same user manager during the last year, indicating that the user manager has not been removing user access for terminated employees in a timely manner. An administrator may use such user access information 134 to train the user manager to be more punctual at removing terminated users.

FIG. 2 shows a frame 200 of the user list 132 for managing asset access according to some embodiments of the present disclosure. The frame 200 includes a user column 202, an asset column 204, a role column 206, an access column 208, a status column 210, a manager column 212, a time column 214, a received column 216, and rows 218 that correspond to the columns 202-216. The user column 202 lists the users 102-108 that have access to the restricted assets 110-116. The asset column 204 lists assets, including the restricted assets 110-116. Although FIG. 2 depicts the asset column 204 as including only software applications, the asset column may also include hardware assets, firmware assets, and combinations thereof. The role column 206 lists user roles that are associated with assets, such as administrator, profile manager, and vendor manager. The access column 208 lists a level of access associated with a corresponding role, such as "read only" for the security table role, "not available" for the administrator role, and "insert update delete" for the profile manager role. The status column 210 lists the review status for the corresponding row, such as approved, modified, added, and removed. The manager column 212 lists the manager that submitted the corresponding status 210, such as Chris. The time column lists the time that the corresponding status 210 was submitted, such as 10:21 in the morning on Jul. 21, 2008. The received column 216 lists the date when the user list 132 corresponding to the frame 200 was received via the user manager interface 126, such as Jul. 17, 2008.

The frame 200 may be displayed on the user manager interface 126 or another user manager interface, such as when a user manager is on vacation and designates another user manager to manage access for the users of the vacationing manager during the vacationing manager's absence. The frame 200 may also be displayed on the administrator interface 130 when the administrator interface 130 is simulating the user manager interface 126 to test the system 100.

The user manager interface 126 may select to "approve access," "remove access," "modify access," "add access," "identify user as terminated," and/or "identify user as not mine" to modify the user list 132 to create the modified user list 136. For example, two of the rows 218 list Tom in the user column 202, identity management in the asset column 204, vendor manager in the role column 206, and "insert update delete" in the access column 208. In response to viewing these two rows, the user manager Chris selected "approved" in the status column 210 for the first of these rows and "removed" in the status column for the second of these rows. When the user manager interface 126 selects "identify user as terminated" and/or "identify user as not mine," the access tool 118 sends user correction information to the employee database 120 and/or the contractor database 122 based on the selection. For example, when the user manager Chris selects "Terminated" for the status column 210 corresponding to the row for John and "Not Mine" for the status column 210 corresponding to the row for Mike, the access tool 118 sends this user correction information to the employee database 120 that includes data for John and the contractor database 122 that includes data for Mike.

FIG. 3 shows a frame 300 of the asset list 138 for managing asset access according to some embodiments of the present disclosure. The frame 300 is substantially similar to the frame 200. The frame 300 includes the user column 302, the asset column 304, the role column 306, the access column 308, the status column 310, the manager column 312, the time column 314, the received column 316, and rows 318-320 that correspond to the columns 302-316. Although FIG. 3 depicts the asset column 304 as including only software applications, the asset column may also include hardware assets, firmware assets, and combinations thereof. The rows 318 are a subset of the rows 218, specifically the rows 218 that list identity management in the asset column 204. The users listed in the rows 320 are managed by user managers other than Chris and have identity management in their asset column 204. The access tool 118 combines data for the users that are managed by Chris and have identity management in their asset column 204 with data for users that are managed by other user managers and have identity management in their asset column 204. The access tool 118 sends this combined data as the asset list 138 to the asset manager interface 128. The asset manager may view the frame 300 of the asset list 138 to identify each recommendation made by a user manager for users to access the asset manager's asset. For example, the frame 200 indicates that the user manager Chris approved Tom to have the Profile Manager role and the corresponding "insert update delete" level of access to the identity management application. Continuing this example, the frame 300 indicates that the asset manager Jean has approved Chris' recommendation by approving Tom to have the Profile Manager role and the corresponding "insert update delete" level of access to the identity management application. The asset manager Jean could have disapproved Chris' recommendation by removing Tom's Profile Manager role and level of access to the identity management application, particularly if Chris assigned Tom another role that conflicts with the Profile Manager role.

The access tool 118 may specify how much progress user managers and asset managers have made in completing the lists that they have received. For example, the user manager Chris has partially completed the frame 200 by providing status 210 entries for 65% (13 of 20) of the rows 218. The access tool 118 may send a reminder notice based on a completion level and/or the time remaining for completion. For example, the access tool 118 sends a reminder notice to the user manager interface 126 for the user manager Chris because Chris has provided status 210 entries for only 65% of the rows 218, and only 2 days are left in the initial 2 week completion period for the user managers.

When the access tool receives a notice of a role change or a position change, the access tool 118 may automatically modify some of the user access to the restricted assets 110-116. For example, when the employee database 120 indicates that Vicky 108 is transferred from the finance department to the accounting department, the access tool 118 removes Vicky's user maintenance role for the finance application 116, but retains approval of Vicky's administrator role for the network analysis application for the finance department manager to review.

The frame 300 may be displayed on the asset manager interface 128 or another asset manager interface, such as when an asset manager is on vacation and designates another asset manager to manage access to the assets of the vacationing asset manager during the vacationing asset manager's absence. The frame 300 may also be displayed on the administrator interface 130 when the administrator interface 130 is simulating the asset manager interface 128 to test the system 100.

Figure 4:
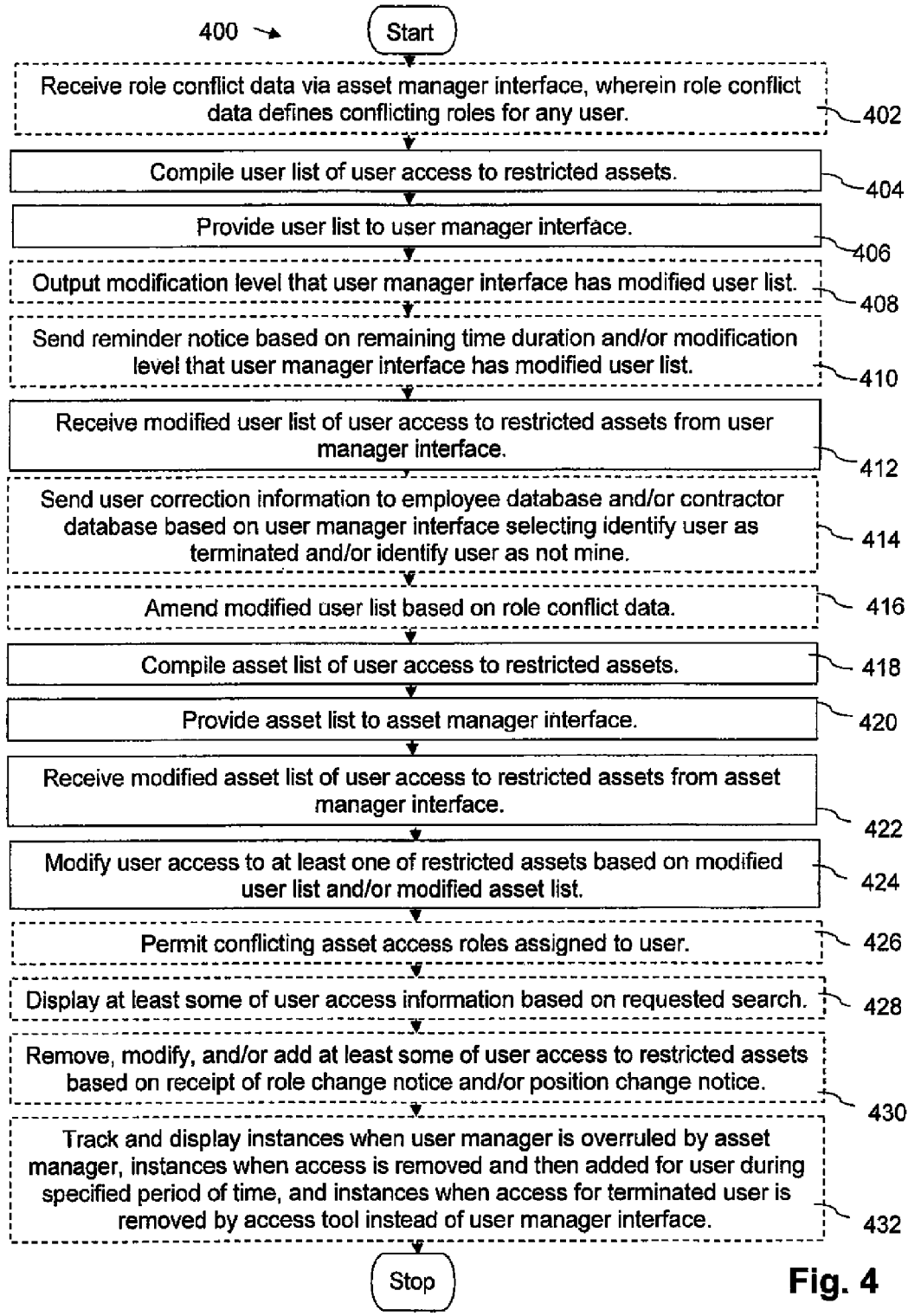
FIG. 4 is a flowchart of a method for a managing asset access according to some embodiments of the present disclosure.

FIG. 4 shows a flowchart of a method 400 for managing asset access according to some embodiments of the present disclosure. The system 100 can execute the method 400 to manage user access to the restricted assets 110-116.

In box 402, role conflict data is optionally received via an asset manager interface, wherein role conflict data defines conflicting roles for any user. For example, the asset manager interface 128 creates the role conflict data 142 by indicating conflicting roles in a spreadsheet matrix and sending the role conflict data 142, which defines the supply chain management role and the accounts payable role as conflicting roles, to the access tool 118.

In box 404, a user list of user access to the restricted assets is compiled. For example, the access tool 118 compiles the user list 132, which may be based on the role conflict data 142.

In box 406, the user list is provided to a user manager interface. For example, the access tool 118 provides the user list 132 to the user manager interface 126 for the user manager Chris.

In box 408, an indication of how much a user manager interface has modified the user list is optionally output. For example, the access tool 118 outputs a 65% level of completion for the user manager Chris to the administrator interface 130.

In box 410, a reminder notice is optionally sent based on the remaining time duration and/or the level of modification that the user manager interface has modified the user list. For example, the access tool 118 sends a reminder notice to the user manager interface 126 for the user manager Chris because Chris has provided status 210 entries for only 65% of the rows 218, and only 2 days are left in the initial 2 week completion period for the user managers to modify the user list 132 to create the modified user list 136.

In box 412, a modified user list of user access to the restricted assets is received from a user manager interface.

For example, the user manager interface 126 sends the modified user list 136 to the access tool 118.

In box 414, user correction information is optionally sent to an employee database and/or a contractor database based on the user manager interface selecting identify user as terminated and/or identify user as not mine. For example, the access tool 118 sends user correction information to the employee database 120 based on the user manager interface 126 selecting "identify user as terminated" for John, a user listed in the employee database 120.

In box 416, the modified user list is optionally amended based on the role conflict data. For example, the access tool 118 highlights the accounts payable role for Tom 106 in the modified user list 136 submitted by the user manager Chris because Chris approved both the supply chain management role and the accounts payable role for Tom 106.

In box 418, an asset list of user access to the restricted assets is compiled. For example, the access tool 118 compiles the asset list 138 based on the modified user list 136.

In box 420, the asset list is provided to an asset manager interface. For example, the access tool 118 provides the asset list 138 to the asset manager interface 128 for the asset manager Jean.

In box 422, a modified asset list of user access to the restricted assets is received from the asset manager interface. For example, the asset manager interface 128 sends the modified asset list 140, including the asset manager Jean's disapproval of Tom's accounts payable role, to the access tool 118.

In box 424, user access to at least one restricted asset is modified based on the modified user list and/or the modified asset list. For example, the access tool 118 removes Tom's account payable role for accessing the finance application 116 based on the modified asset list 140.

In box 426, conflicting asset access roles assigned to a user are optionally permitted via the administrator interface. For example, the access tool 118 permits the administrator interface 140 to restore Tom's account payable role based on an appeal that the user manager Chris made to an administrator.

In box 428, at least some of the user access information is optionally displayed based on a requested search. For example, the access tool 118 responds to a search requested by an auditor by sending the user access information 134 for the last quarter that identifies the user access to the finance application 116, the lists corresponding to the finance application 116, and the process for managing asset access for the finance application 116 to the administrator interface 130.

In box 430, at least some user access to the restricted assets is optionally removed, modified, and/or added based on receipt of a role change notice and/or a position change notice. For example, when Vicky 108 is transferred from the finance department to the accounting department, the access tool 118 removes Vicky's user maintenance role for the finance application 116, but retains approval of Vicky's administrator role for the network analysis application.

In box 432, instances when a user manager is overruled by an asset manager, instances when access is removed and then added for a user during a specified period of time, and instances when access for a terminated user is removed by the access tool instead of the user manager interface are optionally tracked and displayed. For example, the access tool 118 tracks and displays instances when the user manager Chris is overruled by the asset manager Jean during the last year.

Figure 5:
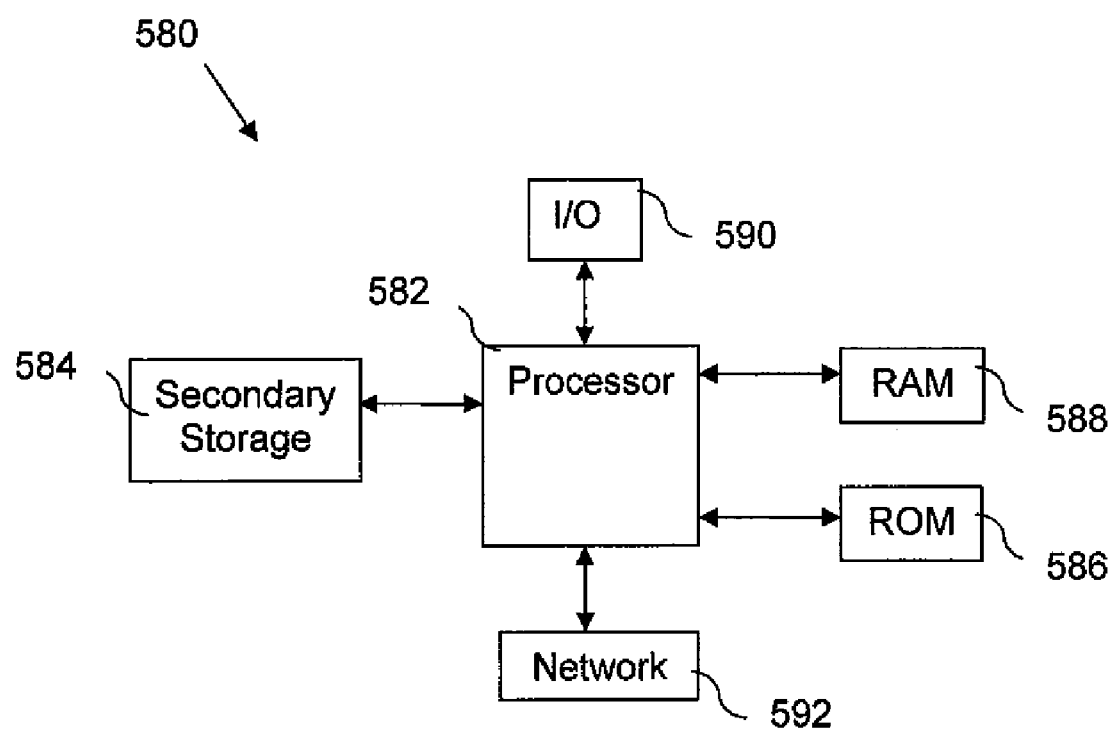
FIG. 5 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 592 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for managing asset access, comprising:
    a processor;
    a user manager interface;
    an asset manager interface; and
    an access tool that, when executed by the processor,
        compiles a user list comprising a list of a first plurality of users and a first plurality of restricted assets, wherein all of the first plurality of users are associated with a single user manager, and wherein the user list associates each restricted asset of the first plurality of restricted assets with a corresponding user of the first plurality of users having access to the restricted asset of the first plurality of restricted assets,
        provides the user list to the user manager interface,
        receives a modified user list of user access to the restricted assets from the user manager interface,
        compiles an asset list comprising a list of a second plurality of users and a second plurality of restricted assets, wherein all of the second plurality of assets are associated with a single asset manager, and wherein the asset list associates each restricted asset of the second plurality of restricted assets with a corresponding user of the second plurality of users having access to the restricted asset of the second plurality of restricted assets,
        provides the asset list to the asset manager interface,
        receives a modified asset list of user access to the restricted assets from the asset manager interface, and
        modifies the user access to at least one of the restricted assets based on at least one of the modified user list and the modified asset list.

2. The system of claim 1, wherein the user access is based on at least one of a plurality of levels of access to the restricted assets and user roles defined via the asset manager interface.

3. The system of claim 1, wherein the restricted assets are at least one of software, hardware, firmware, and an operating system.

4. The system of claim 1, wherein the user manager interface is one of a substitute user manager interface designated via the user manager interface and an administrator interface simulating the user manager interface to test the system.

5. The system of claim 1, wherein the asset manager interface is one of a substitute asset manager interface designated via the asset manager interface and an administrator interface simulating the asset manager interface to test the system.

6. The system of claim 1, wherein the access tool at least one of removes, modifies, and adds at least some of the user access to the restricted assets based on receipt of at least one of a role change notice and a position change notice.

7. The system of claim 1, further comprising a repository to store user access information comprising at least one of the user list, the modified user list, a time associated with receipt of the modified user list, an identity of a user manager associated with the modified user list, the asset list, the modified asset list, a time associated with receipt of the modified asset list, an identity of an asset manager associated with the modified asset list, a confirmation of modifications, a time associated with receipt of the confirmation, levels of access to the restricted assets, and user roles.

8. The system of claim 7, wherein at least one of the user manager interface and the asset manager interface displays at least some of the user access information based on a search requested for at least one of the user list, the modified user list, the asset list, the modified asset list, the identity of the user manager, the identity of the asset manager, the confirmation of modifications, an identity of a user, and a restricted asset.

9. A computer implemented method for managing asset access, comprising:
    compiling a user list comprising a list of a first plurality of users and a first plurality of restricted assets, wherein all of the first plurality of users are associated with a single user manager;
    providing the user list to a user manager interface;
    receiving a modified user list of user access to the restricted assets from the user manager interface;
    compiling an asset list comprising a list of a second plurality of users and a second plurality of restricted assets, wherein all of the second plurality of assets are associated with a single asset manager;
    providing the asset list to an asset manager interface;
    receiving a modified asset list of user access to the restricted assets from the asset manager interface; and
    modifying the user access to at least one of the restricted assets based on at least one of the modified user list and the modified asset list.

10. The method of claim 9, wherein compiling the user list comprises at least one of collecting data that associates users with access to restricted assets and collecting data that associates users with user managers from at least one of an employee database and a contractor database.

11. The method of claim 9, wherein compiling the asset list is based on the modified user list.

12. The method of claim 9, wherein the modified user list is based on a user manager interface modifying the user list by selecting at least one of approve access, remove access, modify access, add access, identify user as terminated, and identify user as not mine.

13. The method of claim 12, further comprising sending user correction information to at least one of an employee database and a contractor database based on a user manager interface selecting at least one of identify user as terminated and identify user as not mine.

14. The method of claim 9, further comprising outputting at least one of a level of modification that a user manager interface has modified the user list and a level of modification that an asset manager interface has modified the asset list.

15. The method of claim 14, further comprising sending a reminder notice based on at least one of a remaining time duration, the level of modification that the user manager interface has modified the user list, and the level of modification that the asset manager interface has modified the asset list.

16. The method of claim 9, further comprising tracking and displaying at least one of instances when a user manager is overruled by an asset manager, instances when an access is removed and then added for a user during a specified period of time, and instances when access for a terminated user is removed by the access tool instead of the user manager interface.

17. A method for managing asset access, comprising:
receiving role conflict data via an asset manager interface, wherein the role conflict data defines conflicting asset access roles for any user;
compiling a user list comprising a list of a first plurality of users and a first plurality of restricted assets, wherein all of the first plurality of users are associated with a single user manager;
providing the user list to a user manager interface;
receiving a modified user list of user access to the restricted assets from the user manager interface;
amending the modified user list based on the role conflict information;
compiling an asset list comprising a list of a second plurality of users and a second plurality of restricted assets, wherein all of the second plurality of assets are associated with a single asset manager;
providing the asset list to an asset manager interface;
receiving a modified asset list of user access to the restricted assets from the asset manager interface; and
modifying the user access to at least one of the restricted assets based on at least one of the amended modified user list and the modified asset list.

18. The method of claim 17 wherein amending the modified user list comprises one of removing conflicting asset access roles assigned to a user based on the role conflict data and highlighting conflicting asset access roles assigned to the user based on the role conflict information.

19. The method of claim 17, wherein compiling the user list is based on the role conflict information.

20. The method of claim 17, further comprising permitting conflicting asset access roles assigned to a user via an administrator interface.

\* \* \* \* \*